United States Patent
Reichenauer

(10) Patent No.: US 6,704,385 B1
(45) Date of Patent: Mar. 9, 2004

(54) METHOD FOR SIMULATING THE RESPONSE OF A DETECTOR OF RADIATION EMITTED BY RADIOACTIVE OBJECTS AND METHOD FOR CONTROLLING NUCLEAR FUEL ELEMENTS USING SAID SIMULATION

(75) Inventor: Patrick Reichenauer, Manasgue (FR)

(73) Assignee: Campagnie General des Matieres Nucleaires, Velizy-Villacoublay (FR)

(*) Notice: Subject to any disclaimer, the term of this patent is extended or adjusted under 35 U.S.C. 154(b) by 0 days.

(21) Appl. No.: 09/763,217
(22) PCT Filed: Aug. 17, 1999
(86) PCT No.: PCT/FR99/02000
§ 371 (c)(1),
(2), (4) Date: Apr. 16, 2001
(87) PCT Pub. No.: WO00/11496
PCT Pub. Date: Mar. 2, 2000

(30) Foreign Application Priority Data

Aug. 18, 1998 (FR) .............................. 98 10513

(51) Int. Cl.⁷ ................. G21C 17/06; G09B 23/20; G01T 1/20
(52) U.S. Cl. ............... 376/257; 376/245; 250/269.1; 250/269.3; 250/269.6; 250/269.7; 434/218
(58) Field of Search ............... 376/245, 257; 250/269.1, 269.8; 434/218

(56) References Cited

U.S. PATENT DOCUMENTS 5,262,947 A * 11/1993 Boudan et al. ......... 364/413.24
5,282,133 A    1/1994 Watson ..................... 364/422

FOREIGN PATENT DOCUMENTS

| EP | 0 009 450 | 4/1980 |
| EP | 0 280 925 | 9/1988 |
| EP | 02194397 | 7/1990 |
| EP | 04029083 | 1/1992 |
| WO | WO 98/19179 | 5/1998 |

* cited by examiner

Primary Examiner—Peter M. Poon
Assistant Examiner—Jack Keith
(74) Attorney, Agent, or Firm—Anderson Kill & Olick, P.C.; Eugene Lieberstein; Michael N. Meller

(57) ABSTRACT

Process for simulation of the response of a detector of radiation emitted by radioactive objects and process for inspection of nuclear fuel elements using this simulation.

The objects (16) contain radioelements or mixes of radioelements. Radioactive emission spectra representative of the radioelements or mixes of radioelements are memorized, detection characteristics of the detector (D) and operating characteristics of the received radiation are determined, the radioelements or mixes of radioelements are chosen and the determined characteristics are processed so as to individually reproduce emitted radiation for selected radioelements or mixes of radioelements. Application to the inspection of nuclear fuel rods.

5 Claims, 2 Drawing Sheets

METHOD FOR SIMULATING THE RESPONSE OF A DETECTOR OF RADIATION EMITTED BY RADIOACTIVE OBJECTS AND METHOD FOR CONTROLLING NUCLEAR FUEL ELEMENTS USING SAID SIMULATION

TECHNICAL FIELD

This invention relates to a process for simulation of the response of a detector of radiation emitted by radioactive objects and a process for inspection of nuclear fuel elements using this simulation.

It is particularly applicable to the inspection of nuclear fuel rods that contain stacks of pellets of this fuel, these pellets emitting $\gamma$ radiation.

STATE OF PRIOR ART

It is known how to inspect a set of rods of this type to verify the homogeneity of pellets in a given category.

In order to do this, a preliminary calibration is made of the $\gamma$ radiation measurement system used for the inspection. For example, the detector for this system is described in documents FR-A-2437002, EP-A-0009450 and JP-A-1527161 that includes an annular scintillator that is preferably made of sodium iodide activated with thallium NaI(Tl).

This calibration also involves making specific rods and passing them in front of the detector, to obtain what are referred to in statistics as regression straight lines, and which in this case give the response of the detector to powder mixes used in the pellets depending on the content of their components (for example uranium and plutonium), for homogenous portions of rods or for isolated pellets in one category among a group of pellets of another category.

This requires a large number of measurements and an equally large number of calibration rods representative of these typical situations, but unusable in a reactor.

PRESENTATION OF THE INVENTION

The purpose of this invention is to overcome the disadvantages mentioned above by proposing a process that can economically control nuclear fuel rods, or more generally nuclear fuel elements. In this process, the preliminary calibration of the measurement system is eliminated and is replaced by a simulation of the response of the measurement system detector, in other words the count made by this measurement system.

Specifically, the initial purpose of this invention is a process to simulate the response of a radiation detector detecting radiation emitted by radioactive objects, these objects containing radioelements or mixes of radioelements, this process being characterized in that:

- radioactive emission spectra representative of radioelements or mixes of radioelements are memorized,
- the detection characteristics of the detector are determined,
- the operating characteristics of received radiation are determined,
- radioelements or mixes of radioelements among hose for which spectra have been memorized are elected, and
- the detection characteristics and operating characteristics are processed so as to individually reproduce radiation emitted for the chosen radioelements or mixes of radioelements, to obtain the simulated detector response.

Preferably, the detection characteristics comprise data representative of the thickness through which the radiation passes before it is detected.

Also preferably, operating characteristics also include the detector aperture angle, detected energy bands and electronic amplification characteristics of the detector.

According to a preferred embodiment of the process according to the invention, regression straight lines are also built up starting from the simulated response.

For example, the detector may be a $\gamma$ radiation detector and the invention is applicable particularly in the case in which the said objects are nuclear fuel elements.

The invention also relates to a process for the inspection of a set of nuclear fuel elements using the simulation process (applied to objects composed of these elements), inspection process in which:

- the real composition of any of the elements of the assembly is analyzed,
- the detector is calibrated with this element for which the real composition has been analyzed,
- the simulated response is corrected using the response of the detector obtained during calibration, and
- all elements are inspected.

For example, the elements may be nuclear fuel rods, these rods including stacks of pellets from this nuclear fuel.

For example, in this case the detector may comprise an annular scintillator, and for example a sodium iodide scintillator may be used.

BRIEF DESCRIPTION OF THE DRAWINGS

This invention will be better understood after reading the description of the example embodiments given below, which is for information only and is in no way restrictive, with reference to the attached drawings in which.

DETAILED PRESENTATION OF PARTICULAR EMBODIMENTS

It is assumed that it is required to inspect a batch (in other words a set) of nuclear fuel rods. Each rod is a stack of pellets, for example containing uranium oxide and/or plutonium oxide. The pellets in these fuel rods are inspected individually. For example, this can be done using the detector described in the documents mentioned above. The structure of this detector is described with reference to FIGS. 1 and 2 throughout the rest of this description.

Figure 1:
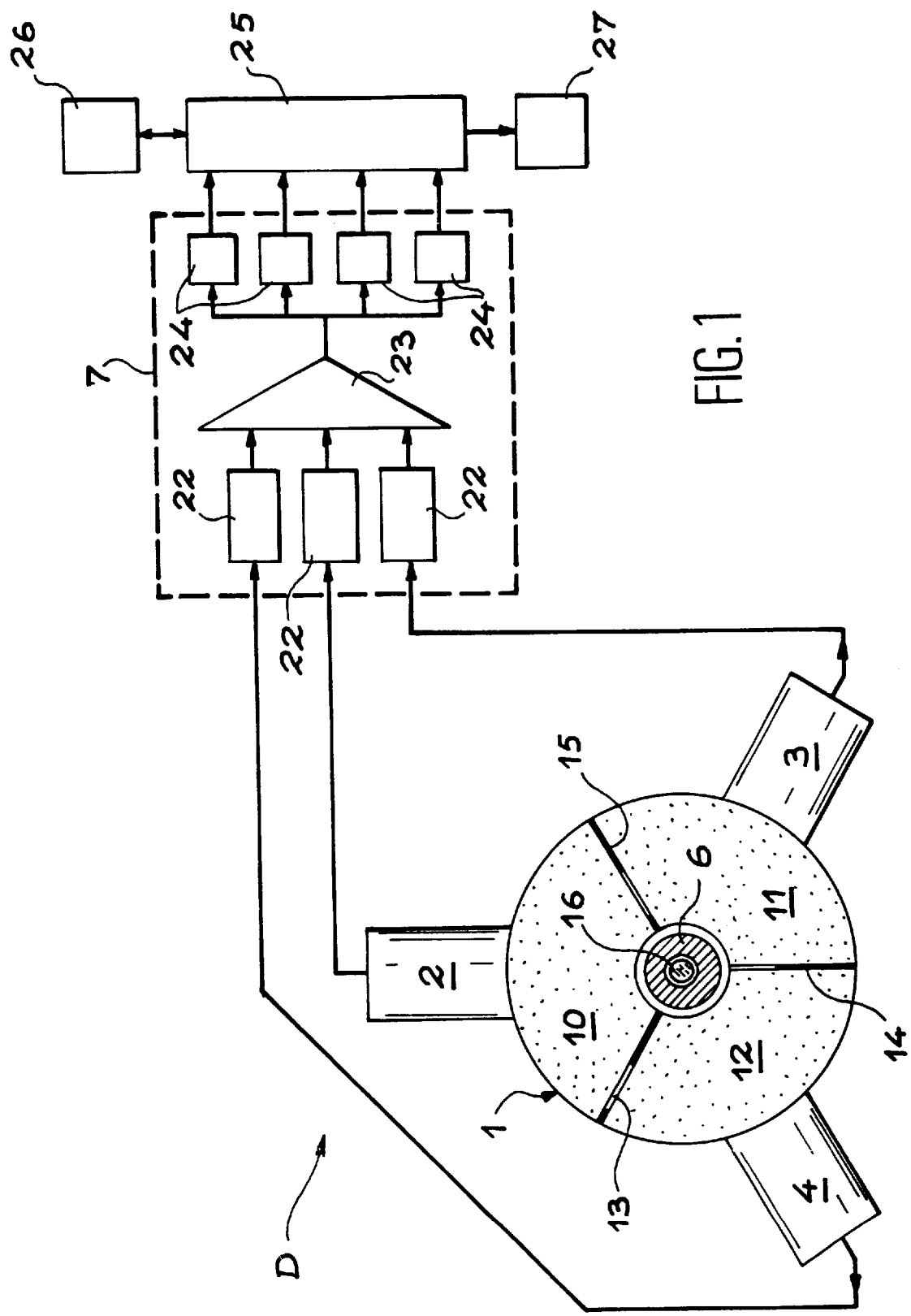
FIG. 1 is a schematic view of a detector for which the response is to be simulated, on a plane perpendicular to the axis of this detector.
Figure 2:
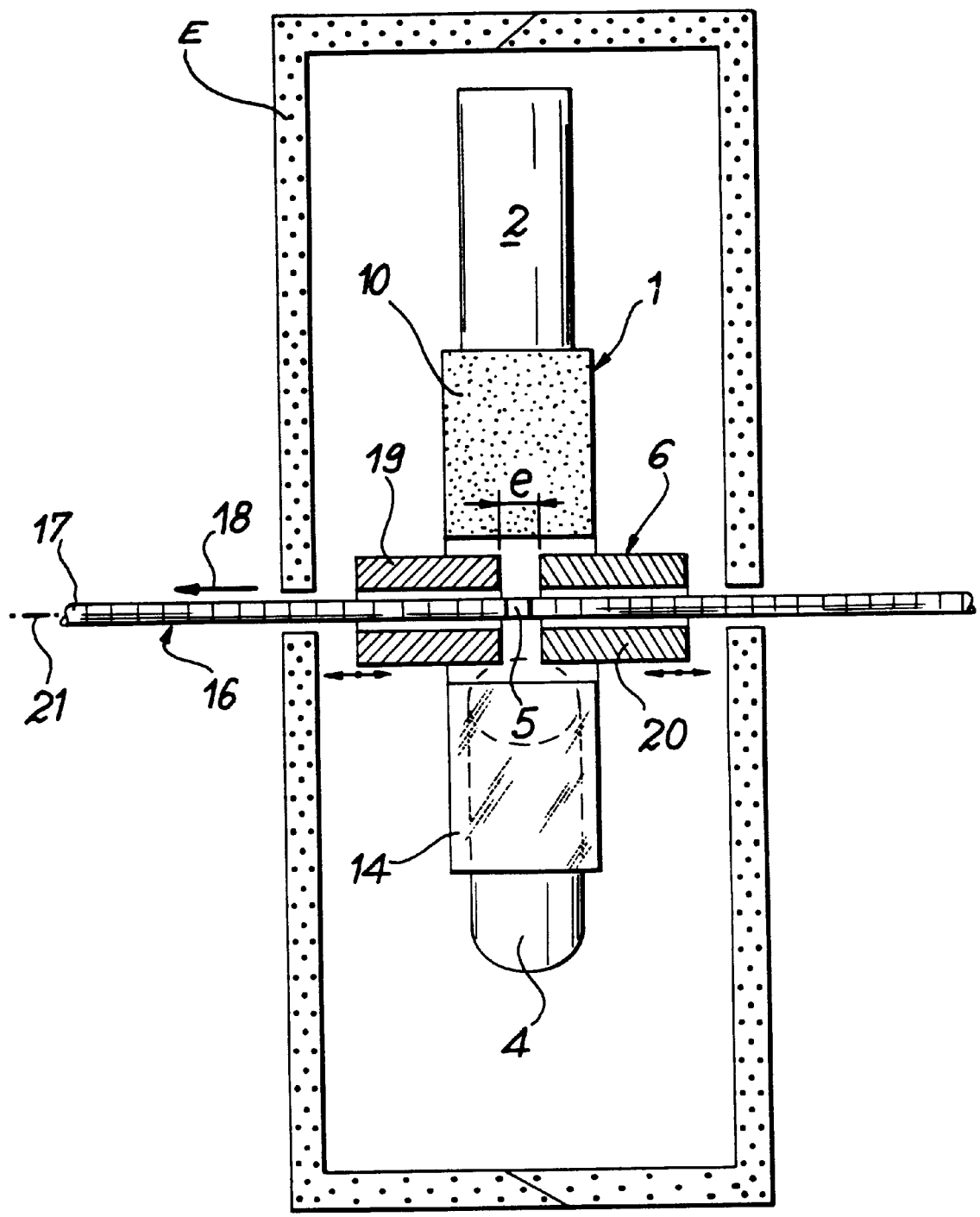
FIG. 2 is a schematic view of the detector shown in its shielded containment along a plane parallel to its axis.

It is a $\gamma$ radiation detector that comprises an annular-shaped scintillator 1 associated with three photomultipliers 2, 3 and 4. FIGS. 1 and 2 show a rod 16 to be inspected that is composed of pellets 5. The detector also comprises a diaphragm or collimator 6. This diaphragm limits the $\gamma$ radiation flux emitted by this pellet towards the scintillator, to approximately the length of each pellet. The three photomultipliers are uniformly distributed around the periphery of the scintillator. The outputs from these photomultipliers are connected to electronic measurement means forming a counting system 7, which will be described later.

The scintillator is divided into identical sectors 10, 11 and 12 that are optically isolated from each other and associated with photomultipliers 2, 3 and 4 respectively. This scintillator is preferably of the sodium iodide type, activated with thallium. Layers 13, 14 and 1S of an optical insulator such as aluminium can be seen, that optically isolate the different sectors in the scintillator.

FIG. 2 shows a shielded containment E protecting the detector against external γ radiation that could disturb the measurements. It also shows that pellets 5 in rod 16 are contained in cladding 17. This rod is moved along a direction 18 by means not shown. It also shows two annular parts 19 and 20 that form the diaphragm 6 and that are opaque to γ radiation. The spacing between these parts is e, that can be adjusted by means not shown. The rod to be inspected is moved along the axis 21 of the detector.

The count system 7 comprises amplifiers-stabilizers 22 associated with photomultipliers, an adder 23 with inputs connected to these amplifiers, and single channel analyzers 24 (four in the example shown in FIG. 2) with inputs connected to the output from adder 23, respectively. A computer 25 is provided for processing of signals output by these single channel analyzers 24. This computer is used with a memory 26 and display means 27 and is also designed to run the software used to simulate the detector response.

When a measurement is made on a pellet 5, a total spectrum is obtained for all isotopes in this pellet by summation (number of pulses per energy channel as a function of the energy) and according to the invention, the software simulates the response of the detector D and can therefore produce a spectrum approximately identical to this total spectrum.

The simulation of the response of detector D is purely digital and is based on the software that is stored in the memory 26 and in which a number of items are input, namely (a) radioactive emission spectra representative of some radioelements or their mixes and that are also memorized in the memory 26, (b) detection characteristics in the form of coefficients and data modelling the thickness through which γ radiation passes and therefore representing the attenuation, (c) operating characteristics of received γ radiation, in particular representing the detector aperture angle, the detected energy bands and amplification of the electronics and (d) a mathematical motor for individual reproduction of γ radiation emitted for the chosen radioelements or the chosen mixes of radioelements.

The generation of representative radiation counts is simulated using a Monte Carlo method using random numbers.

Thus, simulated responses of the detector D can be obtained in order to build up regression straight lines similar to those used in prior art but without making a genuine measurement. The detector is simply calibrated with an arbitrary rod in the batch to be inspected, for which the real composition was analyzed in advance. The response of the detector D obtained with this rod can be used to calculate a fictitious mass that will be useful in all subsequent calculations.

The following description provides additional information about the simulation.

With the software, a count number is calculated and an attempt is made to reproduce the count number for a real pellet. The rod used for the calibration is used to "calibrate" the software. The isotopic composition and percent of each radioelement in each pellet in this rod are known. When the simulation is done, the activity of this isotope is calculated for each isotope i contributing to the spectrum, taking account of all energies j and all attenuations k between the scintillator and a fictitious pellet.

The mathematical motor makes a gaussian distribution of the energy as a function of the resolution.

The result is a simulated spectrum for each isotope i considered. A total spectrum for all isotopes is obtained by summation. Therefore, the response of the detector is simulated. The next step (or the previous step in another particular embodiment) is to use the calibration rod. A true count is obtained for each pellet in the calibration rod, using detector D.

The simulation is started. The parameters for the pellet thus inspected are input into the computer. The computer calculates a spectrum for an area of interest (in other words one or several energy bands in which we are interested). If the count obtained by simulation is too high, or if it is not high enough, the fictitious mass is corrected until the count obtained is the same as the count obtained with the actually inspected pellet (the fictitious mass being the mass of the pellet for which it is required to simulate a response by the detector, using the amplitude of the spectrum rather than its shape). When the count obtained is equivalent, in other words when the correct fictitious mass is obtained, this value will be saved and will be used to calculate all other points on regression straight lines.

Many other detectors could be used instead of the annular sodium iodide scintillator detector. For example, a plane NaI scintillator detector or a GeLi scintillator detector could be used.

The invention can also be used to simulate and inspect other fuel elements than the rods mentioned above for which the pellets are usually cylindrical. For example, plate shaped elements containing non-cylindrical pellets could be simulated and inspected. Furthermore, this invention is not limited to simulation and inspection of nuclear fuel elements. It can be used to simulate and inspect many other radioactive objects, for example receptacles made in series production and containing a radioactive material.

The following description of calculation loops that could be used to simulate the response of the detector D mentioned above (FIGS. 1 and 2) to a nuclear fuel pellet 5 formed by a uranium matrix containing several plutonium isotopes (the only isotopes considered in the following calculations), is given for guidance only and is in no way restrictive:

1) Start loop for isotope (i)

$$Activity_{(i)} = \frac{Av}{A_{(i)}} \times M \times ti \times \% \ isotope_{(i)} \times \lambda_{(i)}$$

where: Av=Avogadro's number=$6.022 \times 10^{23}$
$A_{(i)}$=atomic mass of the isotope (i)
M=fictitious mass of the pellet
ti=isotopic content=percentage of Pu in the matrix
%isotope$_{(i)}$=percentage of isotope(i) contained in the matrix $\lambda_{(i)}$=disintegration constant for isotope(i)

1.1) Start loop for energy (j)

Resolution$_{(j)}$=Energy$_{(j)} \times \alpha$

Initial flux$_{(i,j)}$=Activity$_{(i)} \times$%emission$_{(i,j)} \times \eta/s$ where: η=geometric efficiency of the detector
α=resolution percentage independent of the energy, defined experimentally resolution$_{(j)}$=resolution of the detector for energy (j)
s=surface area of the detector scintillator 1.1.1) Start loop for the attenuator element (k)

$$\lambda_{a(i,j,k)} = \left[ \frac{\sigma a + \sigma a + Z_{(k)} x \sigma a}{PE_{(i,j,k)} PP_{(i,j,k)} C_{(i,j,k)}} \right] \times \tilde{n}_{(k)} \times Av / A_{(k)}$$

where: σa=effective photoelectric absorption cross-section PE$_{(i,j,k)}$

σa=Compton effective absorption cross-section $C_{(i,j,k)}$
σa=Effective cross-section for production of pairs $PP_{(i,j,k)}$
$Z_{(k)}$=atomic number of the attenuator element (k)
$\rho_{(k)}$=density of the attenuator element (k) $A_{(k)}$=atomic mass of the attenuator element (k)

Attenuation coefficient$_{(i,j,k)}$=exp $(-\mu_{a(i,j,k)} \times X_{(k)})$ where: $X_{(k)}$=thickness of the attenuator element (k)

Final flux$_{(i,j,k)}$=Initial flux$_{(i,j,k-1)} \times$Attenuation coefficient$_{(k)}$ 1.1.2) End loop for the attenuator element (k) with initial flux$_{(i,j,k-1)}$ for k=1=initial flux$_{(i,j)}$NaI scintillator:

$$\mu_{a_{(i,j)}^{(NaI)}} = \left[\sigma_{PE_{(j)}}^{(NaI)} + Z_{(NaI)} \times \sigma_{C_{(j)}}^{(NaI)}\right] \times \frac{Av}{A_{(NaI)}} \times \rho_{(NaI)}$$

Absorption$_{(i,j)\,(NaI)}$ = final flux$_{(i,j,k)} \times \mu_{a_{(i,j)}^{(NaI)}} \times X_{(NaI)}$ where: $\sigma_{PE_{(j)}}^{(NaI)} =$ effective photoelectric absorption cross-section for NaI.

$Z_{(NaI)}$=average atomic number of NaI
σa$^{(NaI)}$=Compton effective absorption cross-section for NaI $C_{(j)}$
$A_{(NaI)}$=average atomic mass of NaI
$\rho_{(NaI)}$=average density of NaI
$X_{(NaI)}$=NaI scintillator thickness 1.1.3) Start loop for the procedure to draw values for the photoelectric and Compton absorption.
N=1200 values vn are calculated by drawing random numbers according to a Gaussian distribution centered on an average value equal to Energy$_{(j)}$ and with a standard deviation equal to Resolution$_{(j)}$.

Vn=vn×Absorption$_{(i,j)}$NaI $$\sum_{n=1}^{N}$$

Vn gives absorption spectrum$_{(i,j)}$NaI
1.1.4) End loop to draw values for the photoelectric and Compton absorption Compton dome:

Energy$_{(j')}$=$h\nu_{(j)}$/(1+2$h\nu_{(j)}$/0.511)

Resolution$_{(j')}$=Energy$_{(j')}$×α

$$\text{Dome scattering}_{(j')} = \frac{\sigma^{dif}}{C_{(j')}}(NaI) \times z_{(NaI)} \times \text{Final flux}_{(i,j,k)} \times \frac{Av}{A_{(NaI)}} \times \rho_{(NaI)} \times X_{(NaI)}$$

where: h=Planck's constant $\nu_{(j)}$=frequency corresponding to the energy denoted Energy$_{(j)}$, the Compton dome energy specific to NaI and denoted Energy$_{(j')}$ being the scattered photon energy that is less than Energy$_{(j)}$ $$\frac{\sigma^{dif}}{C_{(j')}} = (NaI) \times Z_{(NaI)} \times \text{Final flux}_{(i,j,k)} \times \frac{Av}{A_{(NaI)}} \times \rho_{(NaI)} \times X_{(NaI)}$$

1.1.5.) Start loop to draw values for Compton scattering.
N=1200 values vn are calculated by drawing random numbers using a Gaussian distribution centered on an average value equal to Energy$_{(j')}$ and with a standard deviation equal to Resolution$_{(j')}$ Vn=vn×Dome scattering$_{(i,j')}$NaI $$\sum_{n=1}^{N}$$

vn gives scattering spectrum$_{(i,j')}$NaI
1.1.6.) End loop to draw values for Compton scattering.
Compton front (the energy of the Compton front being denoted Energy$_{(j'')}$ and less than Energy$_{(j)}$)

Energy$_{(j'')}$={(2×$h\nu_{(j)}$/0.511)/[1+(2×$h\nu_{(j)}$/0.511)]}×$h\nu_{(j)}$ Resolution$_{(j'')}$=Energy$_{(j'')}$×α

Front scattering$_{(j'')}$ $$= \frac{\sigma^{dif}}{C_{(j'')}}(NaI) \times Z_{(NaI)} \times \text{final flux}_{(i,j,k)} \times \frac{Av}{A_{(NaI)}} \times \rho_{(NaI)} \times X_{(NaI)}$$

where: σdif (Nai)=effective Compton front scattering $C_{(j'')}$ cross-section
1.1.7) Start loop to draw values for the Compton front.
N=1200 values vn are calculated by drawing random numbers using a Gaussian distribution centered on an average value equal to Energy$_{(j'')}$ and with a standard deviation equal to Resolution$_{(j'')}$ Vn=vn×Front scattering$_{(j'')}$, NaI $$\sum_{n=1}^{N} vn \text{ gives scattering } spectrum_{(i,j'')}NaI$$

1.1.8) End loop to draw values for Compton front scattering.
Calculation of the Compton background (the energy of the Compton background being denoted Energy$_{(j''')}$ and being less than Energy$_{(j)}$).

Energy$_{(j''')}$=$h\nu_{(j)}$/(1+2$h\nu_{(j)}$/0.511)

Resolution$_{(j''')}$: fixed by experience

Background scattering$_{(j''')}$ $$= \frac{\sigma dif}{C(j''')}(NaI) \times Z_{(NaI)} \times \text{final flux}_{(i,j,k)} \times \frac{Av}{A_{(NaI)}} \times \rho_{(NaI)} \times X_{(NaI)}$$

where:

$$\sigma dif_{C(j''')} = \text{effective Compton background scattering cross-section.}$$

1.1.9) Start loop to draw values for Compton background scattering.

N=1200 values vn are calculated by drawing random numbers using a Gaussian distribution centered on an average value equal to Energy$_{(j''')}$ and with a standard deviation equal to Resolution$_{(j''')}$ $$Vn = vn \times \text{Background scattering}_{(i,j''')}, \text{NaI}$$

$$\sum_{n=1}^{N} vn \text{ gives scattering } spectrum_{(i,j''')} NaI$$

1.1.10) End loop to draw values for Compton background scattering.
1.2) End loop for energy (j)
2) End loop for the isotope (i)

An area of interest for an energy band of interest is then chosen (for example from 75 keV to 100 keV) and the number of pulses is calculated $$S = \sum_{i,j} \sum_{n=1}^{N} (Vn \text{ for absorption } spectrum_{(i,j)} NaI)$$

in this energy band is then calculated. Therefore we neglected scattering but it could be taken into account in another particular embodiment.

$T_m$, which is the percentage of global idle time specific to the count system 7 of the detector D is then determined experimentally, and $Sxt_m$ is calculated.

All calculations can then be repeated for other areas of interest, in other words different energy bands.

What is claimed is:

1. Process to simulate the response of a radiation detector (D) in detecting radiation emitted by radioactive objects (16), each object containing a radioelement or a mix of radioelements, comprising the steps of:

memorizing the radioactive emission spectra representative of the radioelements or mixes of radioelements;

determining the operating characteristics of received radiation;

choosing the radioelements or mixes of radioelements from the memorized radioactive emission spectra corresponding to the content of objects, and processing the radiation emitted for the chosen radioelements or mixes of radioelements using the detection characteristics of the radiation detector and the operating characteristics of the received radiation to individually develop and reproduce a simulated response of the radiation detector.

2. Process according to claim 1, in which the detection characteristics of the detector comprises data representative of the thickness through which the radiation passes before it is detected.

3. Process according to claim 1, in which the operating characteristics of the received radiation includes the operative angle of the radiation detector (D), detected energy bands and electronic amplification characteristics of the radiation detector.

4. Process according to claim 1, in which regression straight lines are also built up starting from the simulated response.

5. Process according to claim 1, in which the detector (D) is a γ radiation detector.

* * * * *